United States Patent
Andoh et al.

(10) Patent No.: US 8,480,887 B2
(45) Date of Patent: Jul. 9, 2013

(54) STORMWATER GULLY

(75) Inventors: Robert Yaw Gyamfi Andoh, South Portland, ME (US); Jeremy Fink, Portland, ME (US); Jeremy Paul Lecornu, Somerset (GB); Michael Guy Faram, North Somerset (GB)

(73) Assignee: Hydro International plc, Clevedon (GB)

( * ) Notice: Subject to any disclaimer, the term of this patent is extended or adjusted under 35 U.S.C. 154(b) by 313 days.

(21) Appl. No.: 12/991,669

(22) PCT Filed: May 8, 2009

(86) PCT No.: PCT/GB2009/050488
§ 371 (c)(1),
(2), (4) Date: Jan. 31, 2011

(87) PCT Pub. No.: WO2009/136208
PCT Pub. Date: Nov. 12, 2009

(65) Prior Publication Data
US 2011/0127204 A1    Jun. 2, 2011

(30) Foreign Application Priority Data
May 9, 2008  (GB) .................................. 0808457.6

(51) Int. Cl.
*E03F 5/04* (2006.01)
*E03F 5/14* (2006.01)

(52) U.S. Cl.
CPC ................. *E03F 5/04* (2013.01); *E03F 5/0403* (2013.01); *E03F 5/0404* (2013.01); *E03F 5/14* (2013.01)
USPC ...... 210/170.03; 210/254; 210/256; 210/299; 137/132; 137/140

(58) Field of Classification Search
USPC .................... 210/163, 164, 170.03, 254, 256, 210/299; 137/132, 140
See application file for complete search history.

(56) References Cited

U.S. PATENT DOCUMENTS 3,347,586 A    10/1967  Sharp
5,746,911 A *  5/1998  Pank ............................. 210/254
(Continued)

FOREIGN PATENT DOCUMENTS

CA    2151519 A1    12/1996
DE    3044426 A1     6/1982
(Continued)

OTHER PUBLICATIONS

International Search Report for PCT/GB2009/050488 filed May 8, 2009.
(Continued)

*Primary Examiner* — Christopher Upton
(74) *Attorney, Agent, or Firm* — Honigman Miller Schwartz and Cohn LLP

(57) ABSTRACT

A stormwater gully comprises a chamber in which an outlet assembly is installed. The outlet assembly comprises filter units connected to an outlet housing. In use, stormwater can flow from the chamber in an upwards direction through filter units into the outlet housing. The outlet housing has an outlet, which extends from the gully. At high rates of flow, the water level in the chamber will rise until water can flow into the outlet housing through bypass inlets. The bypass inlets are connected to the interior of the housing by siphons defined by arched regions of a top cover. The siphons allow rapid discharge of water until the water level returns below the level of the bypass inlets. A slow drain down feature is provided which enables the chamber and outlet assembly to be drained below the level of the primary inlet.

8 Claims, 4 Drawing Sheets

U.S. PATENT DOCUMENTS

| | | | | |
|---|---|---|---|---|
| 6,524,473 B2 * | 2/2003 | Williamson | ............ | 210/170.03 |
| 6,533,941 B2 * | 3/2003 | Butler | ............ | 210/254 |
| 7,005,060 B2 | 2/2006 | Pitt et al. | | |
| 7,052,207 B1 * | 5/2006 | Wimberger | ............ | 210/170.03 |
| 7,374,364 B2 * | 5/2008 | Allard et al. | ............ | 210/170.03 |
| 7,517,450 B2 * | 4/2009 | Hersey et al. | ............ | 210/170.03 |
| 7,686,961 B1 * | 3/2010 | Glynne | ............ | 210/170.03 |
| 2004/0251185 A1 | 12/2004 | Pitt et al. | | |
| 2008/0000845 A1 * | 1/2008 | Lockerman et al. | ............ | 210/163 |
| 2013/0001144 A1 * | 1/2013 | Hutchings et al. | ............ | 210/170.03 |

FOREIGN PATENT DOCUMENTS

| | | |
|---|---|---|
| FR | 2672913 A1 | 8/1992 |
| FR | 2878541 A1 | 6/2006 |
| GB | 191517573 A | 8/1916 |
| GB | 2417437 A | 3/2006 |
| WO | WO-2005003040 A1 | 1/2005 |
| WO | WO-2006114621 A1 | 11/2006 |

OTHER PUBLICATIONS

UK Search Report for Application GB0808457.6 dated Dec. 3, 2008.

UK Search Report for Application GB0808457.6 dated Aug. 24, 2008.

* cited by examiner

STORMWATER GULLY

FIELD

This invention relates to a stormwater gully and to a drain-down outlet for a vessel, which may be a component of a stormwater gully or stormwater retention and treatment systems.

BACKGROUND

Stormwater gullies are used to collect surface water run off, usually from non-porous ground surfaces such as roadways, pavements and other paved areas. Water from the ground surface flows into the gully through an opening at the surface, usually covered by a grating. The gully may also receive flow from underground drains. The gully has an outlet, which is usually connected to a main sewer or outfall.

The gully outlet is usually above the bottom of the gully, so that the lower region of the gully serves as a sump in which solid contaminants of the flow are retained for periodic extraction, so that the water passing to the main sewer is free of at least some of the original contaminants. Also, in periods of heavy flow when the inflow is greater than the maximum capacity of the gully outlet, water will build up in the gully to be discharged later when the incoming flow rate subsides. Such a gully is disclosed in U.S. Pat. No. 7,005,060. In that gully, water flowing from the gully chamber to the outlet passes through an up-flow filter and into an outlet housing, from which the gully outlet extends. Because flow through the filter is upwards, solid contaminants are caught on the underside of the filter and so can fall from the filter into the sump at the bottom of the gully when incoming flow rates subside. The filter restricts the rate of flow towards the gully outlet, and consequently, under periods of heavy incoming flow, the water level in the gully will rise above the filter. A bypass is provided which comprises a weir over which water can flow directly into the outlet housing, and thence to the gully outlet without passing through the filter.

A problem with such gullies is that the flow rate over the weir under conditions of high flow may be inadequate to avoid flooding of the overlying surface. Also, when flow into the gully eases so that the level drops below that of the weir, discharge from the gully then takes place only through the filter. Consequently, the level of water in the gully falls only slowly, leaving little safety margin if one period of heavy rainfall is closely followed by another.

According to the present invention there is provided a stormwater gully comprising a chamber in which an outlet assembly is disposed, the outlet assembly comprising an outlet housing having a primary inlet, provided with a filter unit, for admitting stormwater from the chamber into the outlet housing through the filter unit, and a bypass unit comprising a weir situated at a higher level than the primary inlet for enabling flow of stormwater from the chamber into the outlet housing over. the weir, thereby bypassing the filter unit, the outlet housing having an outlet extending from the chamber, the weir being enclosed by a top cover of the outlet housing so as to define a siphon through which liquid may flow from the chamber into the outlet housing.

The provision of a siphon means that, once the water level in the gully chamber has risen to a sufficient extent to prime the siphon, the discharge of water through the bypass inlet will take place rapidly under the siphon effect. Furthermore, the entrance to the bypass inlet can be positioned below the level of the weir so that rapid water discharge will continue even after the water level has dropped below that of the weir.

The top cover may have an arched region which extends over the weir so as to define up-flow and down-flow legs of the siphon, which legs communicate with each other over the weir.

The weir may be one of two weirs of the outlet assembly, which may be situated generally opposite each other on the outlet assembly, each weir having a respective arched region of the top cover to define respective siphons.

The arched regions of the two weirs may be connected to each other at a valley region of the top cover. The valley region may extend downwardly generally to the level of the top edges of the weirs. Beneath the valley region, the down-flow legs of the siphons merge to form a single duct extending to the outlet.

The outlet housing is preferably disposed adjacent a wall of the gully chamber.

The wall may be cylindrical, and the outlet housing may have an arcuate housing wall configured to conform to the inner surface of the cylindrical wall. In addition, the weirs, and the lower edge regions of the arched regions of the top cover, may lie in planes which extend radially with respect to the cylindrical wall. The weirs may be disposed approximately mid-way between the lower edge regions of the respective arched regions.

According to another aspect of the present invention there is provided a stormwater gully comprising a chamber in which is disposed a vessel comprising a primary inlet from the chamber, having a lower edge at a first level, and a secondary inlet from the chamber, having a lower edge at a second level higher than the first level, the vessel also comprising a drain-down outlet comprising a duct in the form of a siphon, the duct having a first portion which extends upwardly within the vessel from a first and of the duct to a crest of the siphon and a second portion which extends downwardly from the crest of the siphon to a second end of the duct disposed within the chamber outside the vessel, the crest of the siphon being disposed at a level below the lower edge of the secondary inlet.

BRIEF DESCRIPTION OF THE DRAWINGS

For a better understanding of the present invention, and to show more clearly how it may be carried into effect, reference will now be made, by way of example, to the accompanying drawings in which.

DETAILED DESCRIPTION OF THE INVENTION

Figure 1:
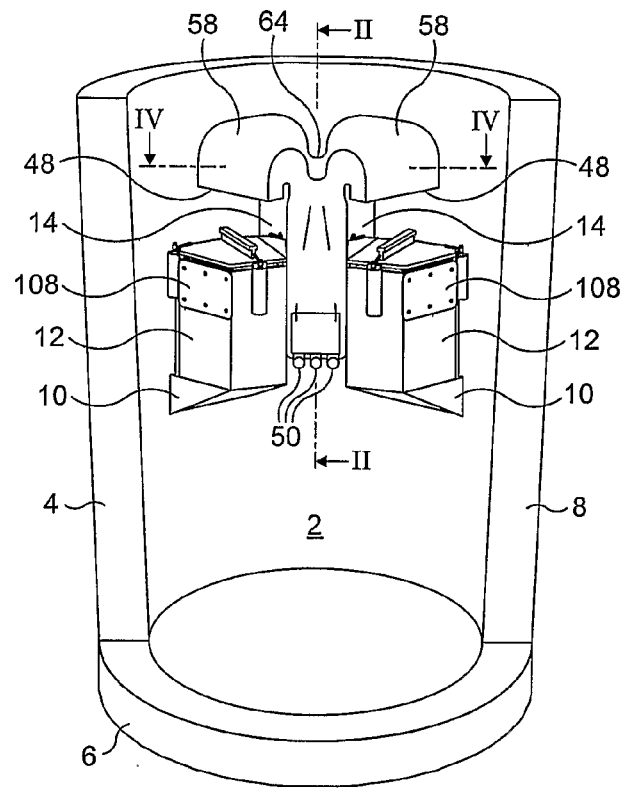
FIG. 1 shows a stormwater gully having an outlet assembly.

As shown in FIG. 1, the gully comprises a chamber 2 defined by a cylindrical wall 4 and a base 6. In FIG. 1 only part of the cylindrical wall 4 is shown for the sake of clarity. In reality the wall 4 extends entirely around the base 6. Within the chamber 2 there is an outlet assembly 8, which in the illustrated embodiment is supported by the wall 4 of the chamber 2. The outlet assembly shown in this embodiment comprises two filter units 12 mounted on brackets 10 and an outlet housing 14, which is supported by the filter units 12. It will be appreciated from FIGS. 3 and 4 that the filter units 12 and the outlet housing 14 have arcuate walls 16, 18 respectively which having the same radius as the internal surface of the cylindrical wall 4, so that the outlet assembly 8 fits snugly against the wall 4.

An outlet 20 extends from the outlet housing 14 through an opening in the wall 4, for connection to downstream pipework such as a main sewer.

Figure 3:
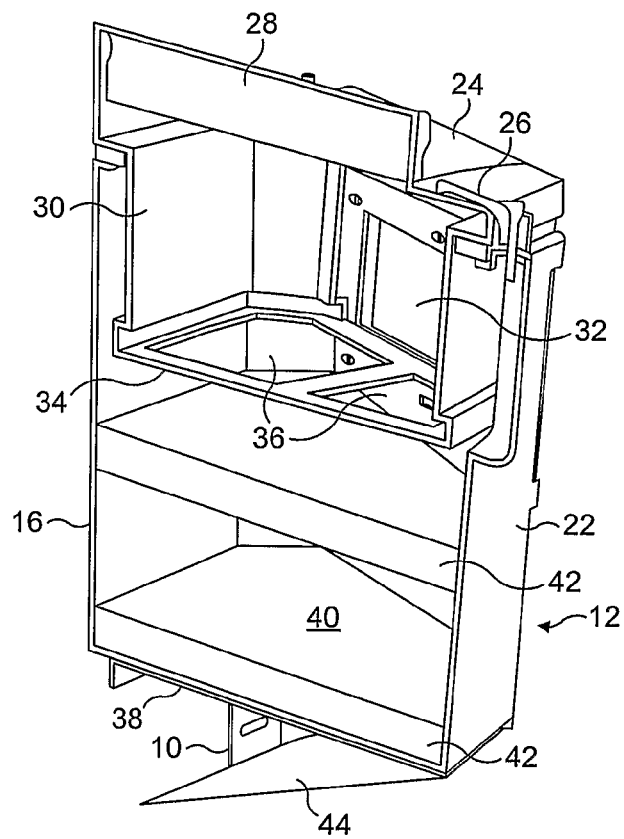
FIG. 3 is a sectioned view of a component of the outlet assembly.

Referring to FIG. 3, each filter unit 12 comprises a casing 22 provided with a lid 24. In normal operation the lid 24 is retained on the casing 22 by rotatable retainers 26. The lid 24 has a handle 28, and depending support structure 30. The casing 22 has a rectangular opening 32 and the support structure 30 terminates at a support panel 34 formed with large apertures 36. The panel 34 is situated just below the bottom edge of the opening 32. The base of the casing 22 is constituted by a panel 38, which, although not shown in FIG. 3, is provided with large apertures corresponding to the apertures 36. The panels 34 and 38 define between them a compartment 40 which contains filter media. In the embodiment shown in FIG. 3, the filter media comprises two blocks 42 of a semi-rigid, slightly buoyant, permeable filtration material. A suitable material for this purpose is available under the name MATALA® from MATALA Water Technology Co Ltd of Taichung, Taiwan.

Each bracket 10 includes a screen 44 in the form of a perforated plate. The lateral ends of the bracket 10 are closed, so that all flow entering the casing 22 through the apertures in the panel 38 must pass through the screen 44.

Figure 2:
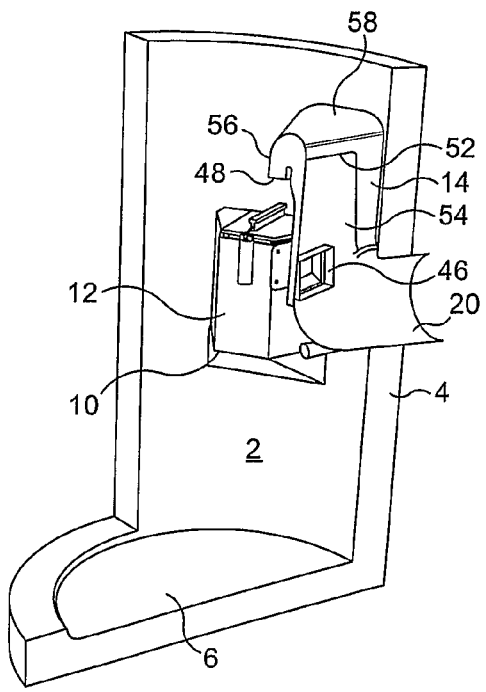
FIG. 2 is a sectional view of the gully taken on the line II-II in FIG. 1.

Each filter unit 12 is connected to the outlet housing 14 at the respective openings 32, which are aligned with corresponding openings 46 in the outlet housing 14 as shown in FIG. 2. Consequently, the interior of each casing 22 communicates with the interior of the outlet housing 14 through the aligned openings 32 and 46, which constitute primary inlets of the outlet housing 14.

The outlet housing 14 is generally in the form of a vertically extending duct having bypass inlets 48 in its upper region, primary inlets constituted by the aligned openings 32, 46 in its central region, and the outlet 20 at its lower region. The outlet housing 14 also has a series of drain-down outlet openings 50, described in more detail below.

Figure 4:
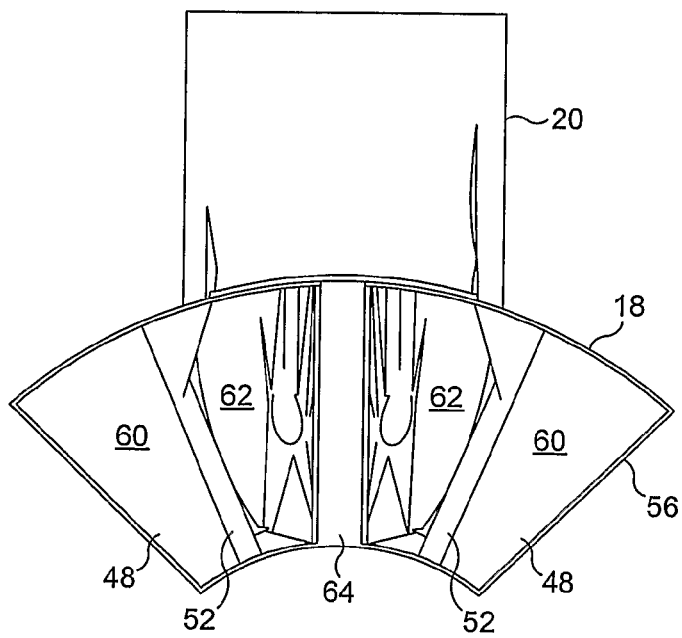
FIG. 4 is a sectioned view of another component of the outlet assembly taken on the line IV-IV in FIG. 1.

With reference to FIGS. 2 and 4, each bypass inlet 48 comprises a weir 52 which extends along the top edge of a wall 54 of the outlet housing 14 which extends generally radially of the rear wall 18 and consequently of the cylindrical wall 4 of the gully. At the top of the outlet housing 14 there is a top cover 56 which is configured to have two arched regions 58 each of which extends over the weir 52 so as to create a siphon having an up-flow leg 60 and a down-flow leg 62 which communicate with each other over the weir 52. It will be appreciated that each of the up-flow legs 60 and down-flow legs 62 widens as viewed in FIG. 4, in the radially outwards direction. The arched regions 58 are connected to each other at a valley 64. Below the valley 64, the down-flow legs 62 merge together to occupy the full cross-section of the housing 14

As shown in FIG. 1, the drain-down outlets 50 are situated in the lower region of the outlet housing 14, and may be provided with any suitable drain-down device. Any outlet 50 that is not used can be closed. The presence of more than one drain-down outlet 50 enables the drain-down rate to be controlled by utilising an appropriate number of them.

Figure 5:
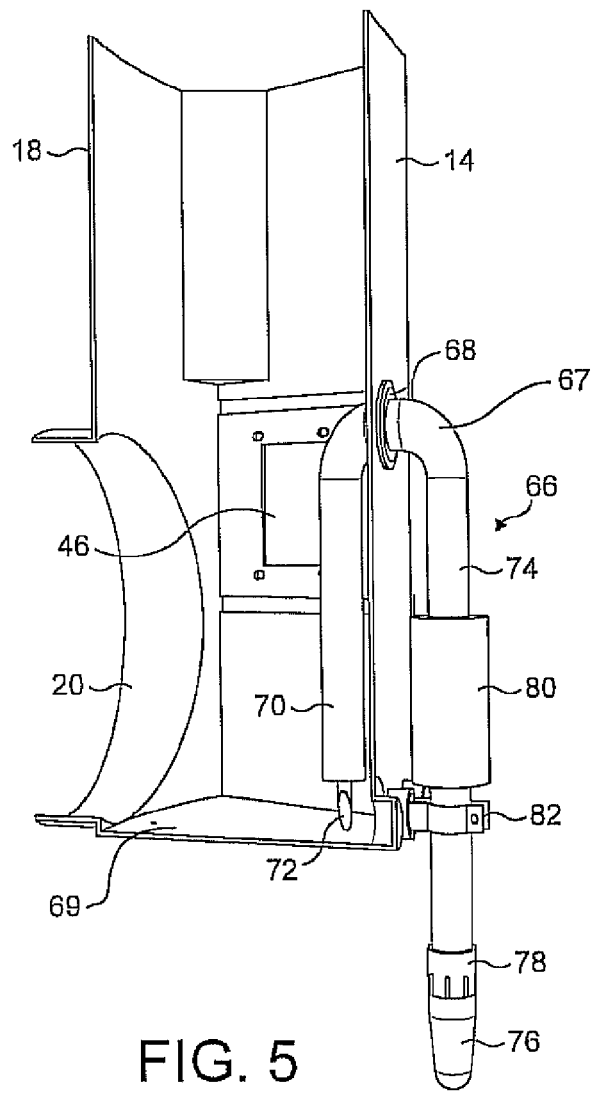
FIG. 5 shows a drain-down outlet for use in the stormwater gully of FIGS. 1 to 4.

FIG. 5 shows an alternative form of drain-down outlet. A duct 66 extends through an opening in the wall of the outlet housing 14, with sealing achieved by a sealing ring 68. The duct 66 has a crest formed by a reverse bend 67 where it passes through the wall of the housing outlet 14, so that a first portion 70, situated within the outlet housing 14, extends upwardly from a position close to the bottom of the outlet housing 14 shown as a base 69, where it terminates at a discharge tube 72 constituting a first end of the duct 66. On the outside of the outlet housing 14, but within the chamber 2, the duct 66 extends downwardly from the reverse bend 67 as a second portion 74 to terminate at a second end below the base 69 of the outlet housing 14, and consequently below the level of the discharge tube 72. At its second end, the second duct portion 74 terminates at an end cap 76, which is releasable from the duct 66 by means of a screw-threaded collar 78. The end cap 76 is perforated or made from a permeable material so that it does not prevent the flow of liquid through the duct 66 from the exterior to the interior of the outlet housing 14.

The discharge tube 72 is of a smaller diameter than the remainder of the duct 66, and consequently serves as a flow restrictor, restricting the rate of flow through the duct 66. The discharge tube 72 has a flow cross-section substantially smaller than that of the duct 66. For example, the discharge tube 72 may have a flow cross-section which is 5% to 20% of that of the duct 66. In one embodiment, the discharge tube has a diameter of 12.5 mm and the duct 66 has a diameter of 38 mm, i.e. a flow cross-section ratio of approximately 10%.

Alternatively, or in addition, the duct 66 may include a separate restrictor at any point along its length. Also, the duct 66 is provided with a filter media, for example in a cartridge 80 disposed in the second portion 74, which may be removable from the duct 66 for replacement of the filter media within it, or for replacement of the entire cartridge 80.

The exterior second portion 74 of the duct 66 is stabilised by means of a clamp 82, which may be secured at one of the outlets 50.

In operation, surface water run off enters the chamber 2 at the top, for example through a grating provided in a road surface. The chamber 2 may also receive flow from underground drainage systems entering through the wall 4. As water accumulates in the chamber 2 it will flow upwards through the perforated screen 44 and the filter media blocks 42 to pass through the aligned openings 32, 46 into the outlet housing 14 and thence through the outlet 20. It will be appreciated that the screen 44 and the filter blocks 42 serve to trap solid materials, so that the water flowing though the outlet 20 is relatively clean. As water flows upwardly through the compartment 40 the slightly buoyant blocks 42 rise from the base panel 38 into contact with the upper panel 34. If inflow of water to the chamber 2 ceases before the water level reaches the lower edge of the opening 32, the level will simply fall again through the compartment 40 allowing the blocks 42 to settle again on the base panel 38. The reverse flow of water through the blocks 42 and the perforated screen 44 will dislodge at least some of the collected solid material, allowing it to fall to the bottom of the chamber 2 where it will settle for eventual periodic collection.

The filter blocks 42 provide a resistance to the flow of water through the primary inlet 32, 46 of the outlet housing 14. Consequently, the flow rate through the filter units 12 into the outlet housing 14 is lower than the maximum capacity of the outlet 20. Under heavy inflows into the chamber 2, the incoming water will not all be able to escape though the filter units 12 and the level within the chamber 2 will continue to rise above the filter units 12. Eventually, the water level will top the weirs 52, and so some additional flow will take place through the bypass inlets 48 to cascade over the weirs 52 and pass into the outlet housing 14 and then to the outlet 20 without first passing through the filter units 12. If the level rises even further, it will fully submerge the outlet housing 14, including the top cover 56 so priming the siphons formed by the weirs 52 and the arched regions 58 of the top cover 56. The siphon effect will cause accelerated flow of the water through the bypass inlets 48, so increasing the discharge from the chamber 2 to a rate which will be sufficient to prevent overflowing of the chamber 2 except in the most extreme conditions. Even after the water has fallen below the level of the weirs 52 the bypass inlet 48 will remain submerged so the siphon effect will continue to reduce the level in the chamber 2 at a rapid rate. Once the water level falls below the inlet to the upwards leg 60 of the siphon, the siphon will be broken and flow from the chamber 2 to the outlet housing 14 will continue through the primary inlets 32, 46. As before, cessation of flow will result in the water level dropping through the filter blocks 42.

In addition, when the water in the chamber 2 reaches a level above the crest 67 of the siphon constituted by the duct 66 (FIG. 5), the siphon will prime so that, as the water level in the chamber 2 outside the siphon subsequently falls below the level of the siphon crest 67, the siphon effect of the duct 66 will continue to carry flow from the interior of the chamber 2 to the interior of the outlet housing 14. The perforated or permeable cap 76 serves to screen any flow passing through the duct 66 from the chamber 2 to the interior of the outlet housing 14, and the filter in the cartridge 80 further serves to restrict the passage of solid material into the outlet housing 14. The reduced diameter discharge tube 72 results in the flow through the duct 66 occurring relatively slowly. The resulting effect is that under low flow conditions, flow from the chamber 2 can reach the interior of the outlet housing 14 through the duct 66, bypassing the filter units 12. Flow through the duct 66 will continue even after the level in the chamber 2 has dropped below that of the lower edge of the primary inlet 32, 46. It will be appreciated that the level of the crest 67 of the siphon (duct 66) need not be above the primary inlet 32, 46, but could be below that inlet.

In an alternative embodiment, the drain-down outlet constituted by the duct 66 may be constructed so as to not provide any siphon effect, but instead to be connected directly to one of the outlets 50. Thus, the duct 66 may have a 90° bend so that it extends outwardly from the outlet 50 for a short distance, before turning at the bend into the downwardly extending portion 74.

Figure 6:
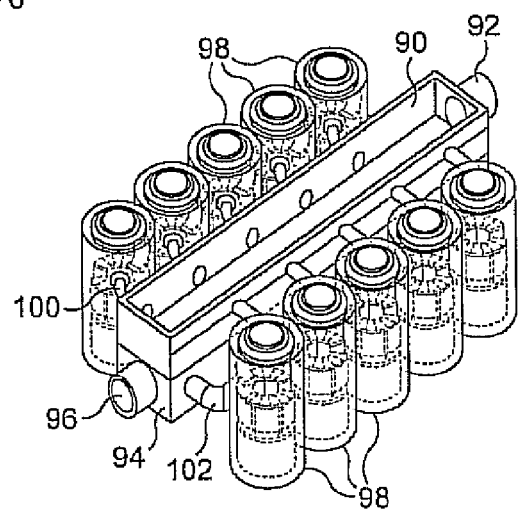
FIG. 6 shows a stormwater retention and treatment system including modules of similar construction to the gully shown in FIGS. 1 to 4.

The stormwater retention and treatment system shown in FIG. 6 comprises an inlet chamber 90, having an inlet pipe 92, and an outlet chamber 94, having an outlet pipe 96. The inlet and outlet chambers 90, 94 are stacked one above the other, and an array of modules 98 (in this case, ten) is arranged on opposite sides of the stacked chambers 90, 94. Each module is similar in construction to the gully shown in FIGS. 1 to 4, and so accommodates an outlet assembly 8 comprising an outlet housing 14 and an arrangement of filter units 12, which are represented in phantom in FIG. 6. Although only two filter units 12 are shown in FIG. 1, other numbers of filter units may be used, as will be discussed in more detail with reference to FIG. 8.

Each module 98 has an inlet connected by a duct 100 to the inlet chamber 90. The inlet opens into the module 98 at a level above the filter units 12. An outlet, corresponding to the outlet 20 in FIG. 2, is connected to the outlet chamber by a duct 102.

In operation, stormwater is conveyed by suitable pipework to the inlet pipe 92, and so enters the inlet chamber 90. From there, the water flows to the modules 98, and passes through the filter units 12 to the outlet housing 14 and then to the outlet chamber 94 to be discharged through the outlet pipe 96. It will be appreciated that the system thus provides a stormwater retention function, since stormwater can accumulate in the chambers 90, 94 and in the modules 98, so reducing the load on downstream equipment. When flow levels subside, water can drain from the modules 98 through the outlet housing 14, to make capacity available for the next period of heavy flow.

Figure 7:
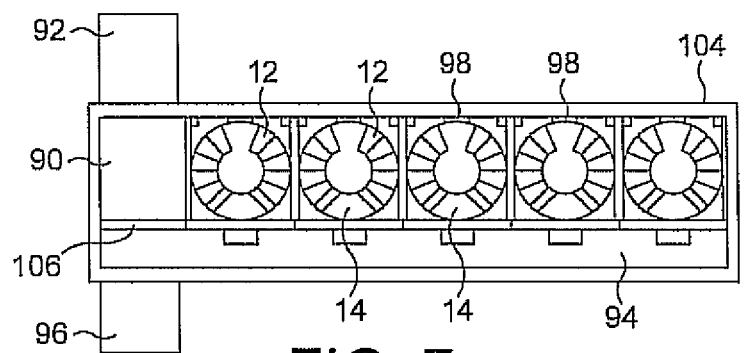
FIG. 7 shows another embodiment of a stormwater retention and treatment system.

FIG. 7 shows a similar system, although in this case the inlet and outlet chambers 90, 94 are disposed side-by side in a common housing 104, separated by a partition 106.

Figure 8:
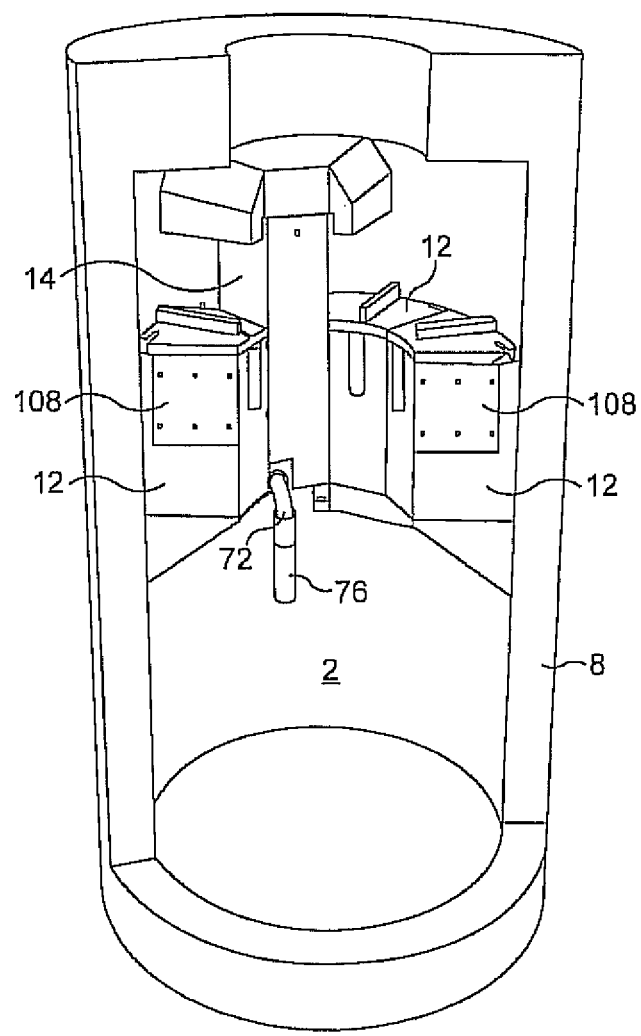
FIG. 8 corresponds to FIG. 1 but shows an alternative configuration.

As shown in FIG. 8, different numbers of filter units 12 may be provided in a single gully or module 98. It will be appreciated that each casing 22 (FIG. 1) has one of the openings 32 on each of two generally opposite walls, which walls extend radially of the chamber 2. Consequently, the filter units may be mounted side-by-side with their openings 32 in communication with each other. The openings 32 in the outermost walls (i.e. the walls that do not contact another filter unit 12) are closed by means of closure panels 108. Thus, in use, water can flow from one filter unit 12 to the next, until it reaches the outlet housing 14.

The number of filter units in each gully or module will depend on the filtering capacity required; in some circumstances, the filter units may occupy the entire arcuate extent of the gully or module between the opposite sides of the outlet housing 14. For example, six filter units 12 may be accommodated in a single gully or module 98.

The invention claimed is:

1. A stormwater gully comprising:
    a chamber;
    an outlet assembly disposed in the chamber, the outlet assembly comprising an outlet housing having:
        a primary inlet, provided with a filter unit, communicating with the chamber so as to admit stormwater from the chamber into the outlet housing through the filter unit,
        a bypass unit comprising a weir situated at a higher level than the primary inlet, the bypass unit communicating with the chamber so as to enable flow of stormwater from the chamber into the outlet housing over the weir, thereby bypassing the filter unit, and
        an outlet extending from the chamber,
        wherein the outlet housing has a top cover which encloses the weir so as to define a siphon providing communication between the chamber and the outlet housing.

2. A stormwater gully as claimed in claim 1, in which the top cover has an arched region extending over the weir and defining up-flow and down-flow legs of the siphon, which legs communicate with each other over the weir.

3. A stormwater gully as claimed in claim 2, in which the weir is one of two weirs of the outlet assembly, the top cover having two respective arched regions, which define, with the weirs, respective siphons.

4. A stormwater gully as claimed in claim 3, in which the arched regions are interconnected by a valley region of the top cover.

5. A stormwater gully as claimed in claim 1, in which the outlet assembly is disposed adjacent a wall of the chamber.

6. A stormwater gully as claimed in claim 5, in which the wall is cylindrical.

7. A stormwater gully as claimed in claim 6, in which the weir is one of two weirs of the outlet assembly, the top cover having two respective arched regions, each arched region extending over a respective one of the weirs and defining up-flow and down-flow legs of the respective siphon, which legs communicate with each other over the weir, the arched regions being interconnected by a valley region of the top cover, wherein the or each arched region is provided with lower edge regions which extend radially with respect to the cylindrical wall of the chamber.

8. A stormwater gully as claimed in claim 7, in which the or each weir extends radially with respect to the cylindrical wall, and is situated approximately mid way between the lower edge regions of the respective arched region.

\* \* \* \* \*